United States Patent
Lin et al.

(10) Patent No.: US 11,683,406 B2
(45) Date of Patent: *Jun. 20, 2023

(54) HOOK SWITCHING FOR TELEPHONE BASED ON WIRELESS CHARGING PROTOCOL

(71) Applicant: Cisco Technology, Inc., San Jose, CA (US)

(72) Inventors: Yikai Lin, Shanghai (CN); Zhaozhuo Li, Shanghai (CN); Jianhua Jiang, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/554,670

(22) Filed: Dec. 17, 2021

(65) Prior Publication Data

US 2022/0109749 A1    Apr. 7, 2022

Related U.S. Application Data

(63) Continuation of application No. 16/851,810, filed on Apr. 17, 2020, now Pat. No. 11,290,586.

(51) Int. Cl.
*H04M 1/10* (2006.01)
*H02J 50/10* (2016.01)
(Continued)

(52) U.S. Cl.
CPC .............. *H04M 1/10* (2013.01); *H02J 7/02* (2013.01); *H02J 50/10* (2016.02); *H04B 5/0037* (2013.01); *H04B 5/0075* (2013.01)

(58) Field of Classification Search
CPC .... H04M 1/10; H04M 1/727; H04M 1/72502; H02J 7/02; H02J 50/10; H02J 7/00045;
(Continued)

(56) References Cited

U.S. PATENT DOCUMENTS 3,644,681 A * 2/1972 Rice .................. H04M 1/72502
                                                    455/462
4,467,140 A * 8/1984 Fathauer ........... H04M 1/72505
                                                    455/411
(Continued)

FOREIGN PATENT DOCUMENTS

EP    2876870 A1    5/2015
EP    3121924 A1    1/2017
(Continued)

OTHER PUBLICATIONS

Wireless Power Consortium, "The Qi Wireless Power Transfer System Power Class 0 Specification", Parts 1 and 2: Interface Definitions, Version 1.2.4 Final Draft, Feb. 2018, 179 pages.

(Continued)

*Primary Examiner* — Lewis G West
(74) *Attorney, Agent, or Firm* — Edell, Shapiro & Finnan, LLC (57) ABSTRACT

A method of performing hook switching on behalf of a wireless handset based on wireless charging. The method includes obtaining, by a power transmitter of a telephone base, a handset identifier provided by a wireless handset via a power receiver that is wirelessly coupled to the power transmitter for wireless charging of the wireless handset. The method further includes determining whether the handset identifier matches a stored identifier, and based, in part, on the handset identifier matching the stored identifier, performing, by the telephone base, hook switching on behalf of the wireless handset.

20 Claims, 5 Drawing Sheets

(51) Int. Cl.
*H02J 7/02* (2016.01)
*H04B 5/00* (2006.01)

(58) Field of Classification Search
CPC ............. H02J 7/00034; H02J 2310/22; H04B 5/0037; H04B 5/0075
See application file for complete search history.

(56) References Cited

U.S. PATENT DOCUMENTS

| | | | | |
|---|---|---|---|---|
| 4,873,717 | A * | 10/1989 | Davidson | H04Q 11/0428 379/207.05 |
| 6,049,701 | A * | 4/2000 | Sparksman | H04M 1/725 455/462 |
| 6,154,650 | A * | 11/2000 | Abidi | H04W 88/06 455/433 |
| 6,804,536 | B1 * | 10/2004 | Bultman | H04W 92/08 455/554.1 |
| 7,519,392 | B2 * | 4/2009 | Kwak | H04M 1/72409 455/554.2 |
| 7,825,625 | B2 * | 11/2010 | Posamentier | H02J 50/40 320/108 |
| 7,899,434 | B2 * | 3/2011 | Cohen | H04W 52/0261 455/343.1 |
| 8,879,430 | B2 | 11/2014 | Goodman et al. | |
| 8,891,755 | B2 * | 11/2014 | Cheng | H04M 1/10 379/423 |
| 9,503,178 | B2 | 11/2016 | Lee et al. | |
| 10,468,903 | B2 | 11/2019 | Park et al. | |
| 11,290,586 | B2 * | 3/2022 | Lin | H02J 7/00034 |
| 2008/0080703 | A1 | 4/2008 | Penning | H04M 1/72502 379/428.02 |
| 2010/0062731 | A1 * | 3/2010 | Ham | G06F 1/1632 455/90.3 |
| 2011/0043327 | A1 * | 2/2011 | Baarman | H02J 50/402 340/10.34 |
| 2018/0309314 | A1 * | 10/2018 | White, II | H02J 50/12 |
| 2019/0190324 | A1 * | 6/2019 | Bossetti | H02J 50/12 |
| 2019/0363590 | A1 * | 11/2019 | Jakubowski | H02J 50/80 |
| 2020/0044474 | A1 * | 2/2020 | Baysinger | H02J 50/40 |
| 2020/0350789 | A1 * | 11/2020 | Jakl | H02J 7/027 |
| 2020/0371897 | A1 * | 11/2020 | Hansmann | G06F 11/3476 |
| 2021/0179865 | A1 * | 6/2021 | Molard | C09D 5/22 |
| 2021/0273491 | A1 * | 9/2021 | Lee | H02J 50/402 |

FOREIGN PATENT DOCUMENTS

| | | |
|---|---|---|
| GB | 2394843 A | 5/2004 |
| JP | 5445122 B2 | 7/2011 |
| JP | 2013055517 A | 3/2013 |
| KR | 0151413 B1 | 7/1995 |
| WO | 2019024251 A1 | 2/2019 |

OTHER PUBLICATIONS

Wireless Power Consortium, "The Qi Wireless Power Transfer System Power Class 0 Specification", Part 3: Compliance Testing, Version 1.2.4 Final Draft, Feb. 2018, 253 pages.

Wireless Power Consortium, "The Qi Wireless Power Transfer System Power Class 0 Specification", Part 4: Reference Designs, Version 1.2.4 Final Draft, Feb. 2018, 363 pages.

Wireless Power Consortium, "The Qi Wireless Power Transfer System Power Class 0 Specification", Part 4: Reference Designs, Version 1.2.3, Feb. 2017, 336 pages.

Wireless Power Consortium, "The Qi Wireless Power Transfer System Power Class 0 Specification", Parts 1 and 2: Interface Definitions, Version 1.2.3, Feb. 2017, 165 pages.

Wireless Power Consortium, "Introduction to the Power Class 0 Specification", Version 1.2.3, Feb. 2017, 16 pages.

Reddit Inc, "Auto answer phone when picked up from wireless charger", 3 pages, retrieved from Internet Mar. 3, 2020; https://www.reddit.com/r/tasker/comments/2sndg6/auto_answer_phone_when_picked_up_from_wireless/.

International Search Report and Written Opinion in counterpart International Application No. PCT/US2021/027025, dated Jul. 16, 2021, 14 pages.

Yealink, "W53P & W60P DECT IP Phone User Guide", Version 83.10, Yealink(Xiamen) Network Technology Co., Ltd., Aug. 2018, 72 pages.

Yealink, "Does Yealink DECT phone support Auto Answer", Yealink Support, Jun. 30, 2021, 1 page; https://support.yealink.com/en/portal/knowledge/show?id=477843acb5481a87ac8c9004, last visited Nov. 16, 2021.

Intermedia Cloud Communications, "Yealink W52: How to Use Auto Answer", Article ID: 27236, Jun. 1, 2020, 1 page; https://kb.intermedia.net/article/27236, last visited Nov. 16, 2021.

* cited by examiner

HOOK SWITCHING FOR TELEPHONE BASED ON WIRELESS CHARGING PROTOCOL

CROSS REFERENCE TO RELATED APPLICATION

This application is a Continuation application of U.S. patent application Ser. No. 16/851,810, filed Apr. 17, 2020, the entirety of which is incorporated herein by reference for all purposes.

TECHNICAL FIELD

The present disclosure relates to telephone devices.

BACKGROUND

A recent trend to improve consumer convenience in electronic devices is to redesign wired devices to become wireless. Desktop telephones are no exception to this trend. Moreover, wireless charging is a recently developed technology that is being deployed to facilitate charging of devices without requiring a physical electrical connection.

DESCRIPTION OF EXAMPLE EMBODIMENTS

Overview

Briefly, in one embodiment, methods are presented for providing telephone devices with hook switching capability when a wireless handset is charged by a telephone base using a wireless charging protocol.

In these methods, a power transmitter of a telephone base obtains a handset identifier provided by a wireless handset via a power receiver that is wirelessly coupled to the power transmitter for wireless charging of the wireless handset. The power transmitter determines whether the handset identifier matches a stored identifier. Based, in part, on the handset identifier matching the stored identifier, the telephone base performs hook switching on behalf of the wireless handset.

Example Embodiments

Desktop telephones are widely used. Existing desktop telephones include a handset and a telephone base connected to each other via a wired cord or via a wireless connection. The telephone base includes a mechanical hook switch is engaged by the handset. When the handset is placed on the telephone base, the mechanical hook switch is depressed or engaged, thereby causing the desktop telephone to assume an "on-hook" status. When a call is to be made or there is an incoming call to be answered, a user picks up the handset and the mechanical hook switch is released. Accordingly, the desktop telephone assumes an "off-hook" status. In the "off-hook" status, the incoming call is automatically answered or a dial tone is provided for the user to make a call. After the user completes the call, the handset is placed back on the telephone base and the mechanical hook switch is depressed. Any call that was occurring is automatically disconnected and the desktop telephone assumes the "off-hook" status.

Techniques are desired to provide hook switching for desktop telephones without the mechanical hook switch on the telephone base. One existing solution involves placing magnetic sensors on the telephone base to detect "off-hook" and "on-hook" states. This, however, requires additional components, thereby increasing the cost and complexity of the desktop telephones.

In various example embodiments presented herein, hook switching of a desktop telephone is performed using existing components that wirelessly charge the handset. In particular, a telephone base may wirelessly connect with the handset, called a wireless handset in this instance, via any of one or more communication protocols, such as the Digital Enhanced Cordless Telecommunications (DECT) protocol, the Bluetooth® wireless communication protocol. The telephone base may also charge one or more batteries in the wireless handset according to a wireless charging protocol. One example of a wireless charging protocol is the Wireless Power Consortium (WPC) Qi Protocol (version 1.2.4), for example. According to the embodiments presented herein, the components of the telephone base that wirelessly charge the wireless handset are also configured to detect presence and absence of the wireless handset at a charging position on the telephone base in order to perform the hook switching.

The hook switching techniques presented herein exploit operations performed by a power transmitter of the telephone base and a power receiver of the wireless handset in the course of controlling wireless charging of the wireless handset. As a result, the desktop telephone no longer needs a mechanical hook switch, thereby improving the design, decreasing complexity, and reducing cost of the desktop telephone. In other words, the desktop telephone does not include any additional circuitry or sensors to perform hook switching. Since no additional components are required for the solution presented herein, power that the additional components would otherwise consume is avoided.

The techniques presented below are not limited to a desktop telephone and are applicable to any telephones that have a telephone base and a wireless handset.

Figure 1A:
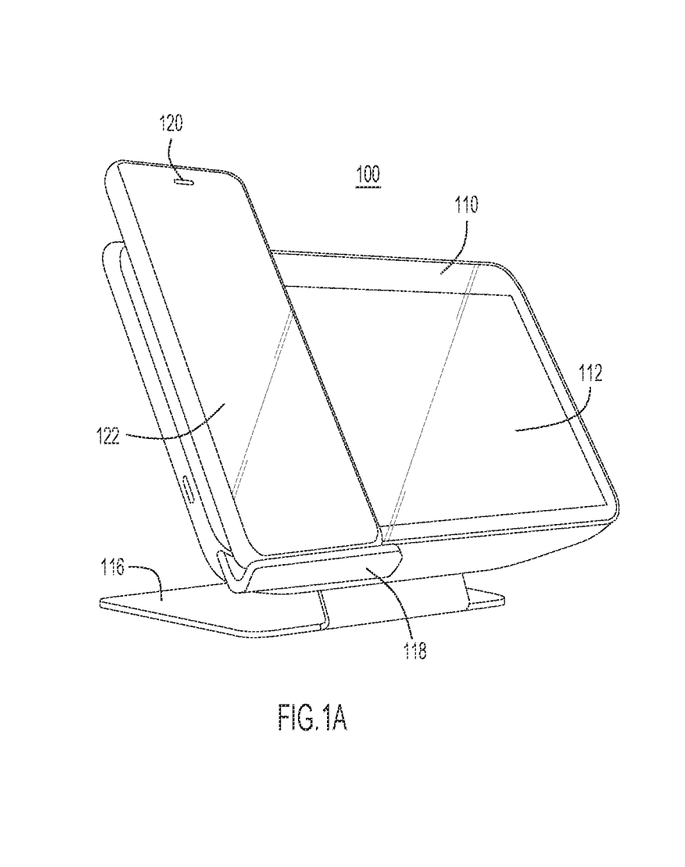
FIG. 1A is a diagram illustrating a desktop telephone apparatus including a telephone base and a wireless handset, wherein the telephone base and wireless handset are configured to permit wireless charging of the wireless handset and perform hook switching, according to the techniques presented herein.
Figure 1B:
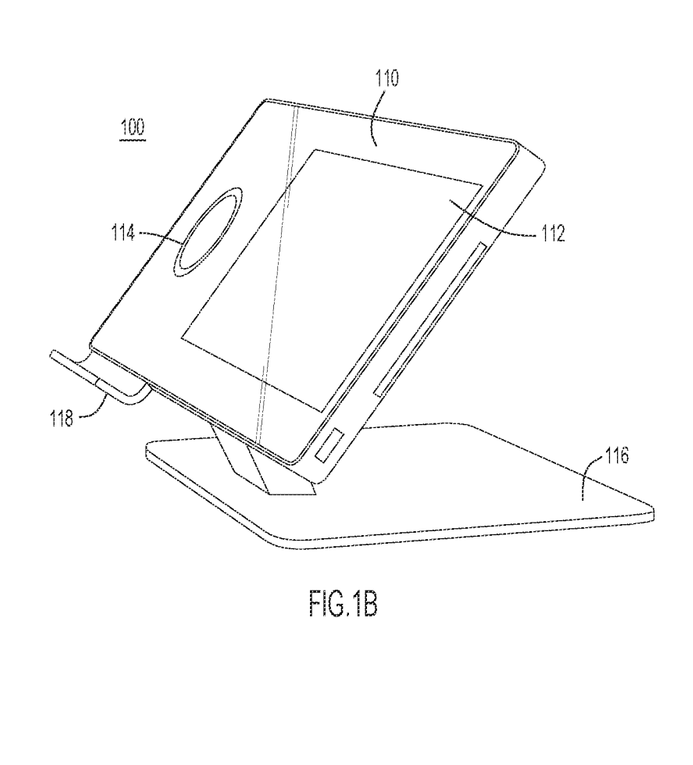
FIG. 1B is a diagram of the telephone base of the desktop telephone apparatus shown in FIG. 1A, but with the wireless handset removed from the wireless charging position on the telephone base.

Reference is now made to FIGS. 1A and 1B that illustrate a desktop telephone 100, according to an example embodiment. The desktop telephone 100 includes a telephone base 110 and a wireless handset 120. The telephone base 110 has a flat front surface with a base touch screen display 112, a charging position 114, a base stand 116, and a wireless handset holder 118. The wireless handset 120 includes a handset touch screen display 122.

In FIG. 1A, the wireless handset 120 is placed in the charging position 114 that is on a flat surface of a housing of the telephone base 110. In the charging position 114, the wireless handset 120 rests on the wireless handset holder 118 abutting an interface surface that is proximate to charging components. In this arrangement, the telephone base 110 can wireless charge the wireless handset 120.

FIG. 1B shows the desktop telephone 100 with the wireless handset 120 removed from the charging position 114. The wireless handset 120 is in short-range communication distance of the telephone base 110 to receive or place calls when it is removed from the charging position 114, and even when it is placed in the charging position 114.

According to the embodiments presented herein, the telephone base 110 does not include a mechanical hook switch that is engaged by the wireless handset 120 when the wireless handset 120 is placed on the telephone base 110. Rather, the hook switching is performed by the telephone base 110 on behalf of the wireless handset 120 by exploiting signaling performed as part of a wireless charging protocol employed to control wireless charging of the wireless handset 120.

It is to be understood that the appearance and mechanical design of the desktop telephone 100 shown in FIGS. 1A and 1B is not meant to be limiting. There are numerous other ways to support the wireless handset 120 on the telephone base 110 so that the wireless handset 120 can be wirelessly charged by the telephone base 110. Moreover, the telephone base 110 need not have a smooth and flat display such as the base touch screen display 112. The display on the telephone base 110 may take on many different forms. Moreover, there may be a mechanical keypad and other mechanical buttons on the face of the telephone base 110. Further still, the telephone base 110 may have a camera to facilitate video communication.

Various internal components of the desktop telephone 100, according to an example embodiment, are now described with reference to FIG. 2. The desktop telephone 100 may be configured to implement Voice over Internet Protocol (VoIP) techniques for conducting telephone calls over an IP network. In another form, the desktop telephone 100 may be configured to conduct telephone calls in a more conventional manner directly over a public switched telephone network (PSTN).

The telephone base 110 includes a base system 130 and a power transmitter 150. The base system 130 includes a base central processing unit (CPU) 132, a base memory 134, a network interface card 136, VoIP telephony card(s) 138 (which may take the form of one or more Application Specific Integrated Circuits (ASICs)), the base touch screen display 112, and a power supply 142. A bus (not shown) may be provided to enable communication between the base CPU 132 and the other components. The bus may be implemented with any architecture designed for passing data and/or control information between the base CPU 132 and other components.

The base memory 134 may include persistent storage. In one example embodiment, the base memory 134 includes a random access memory (RAM) and a cache memory. In general, the base memory 134 can include any suitable volatile or non-volatile computer readable storage media. The base memory 134 may be a solid state hard drive, a semiconductor storage device, or any other computer readable storage media that is capable of storing program instructions or digital information. Instructions for control logic may be stored in the base memory 134 for execution by the base CPU 132. The control logic may include one or more programs stored in the base memory 134 for execution by the base CPU 132.

For example, the control logic stored in base memory 134 includes instructions that, when executed by the base CPU 132, cause the telephone base 110 to perform various control functions for the telephone base, such as connecting/disconnecting the phone call when the hook status changes, as described in more detail below. Also, the control logic includes instructions, that when executed by the base CPU 132 cause the telephone base 110 to manage the transmission and reception of voice signals and handle other telephone functionality.

The network interface card 136 provides for data network communication with other systems or devices. In these examples, the network interface card 136 may provide network communications through the use of either or both physical and wireless communications links. The network interface card 136 connects the telephone base 110 to a communication network, via a router or gateway, to enable connectivity to a local access network (LAN) which in turn is connected to a public network (wide area network) such as the Internet.

The VoIP telephony card(s) 138 are hardware component(s) that perform network telephony, including conversion digital-to-analog conversion and analog-to-digital conversion of audio, packetizing of digital audio into data packets, as well as other VoIP telephone functions.

The base touch screen display 112 is an input/output interface that allows for touch-based input of controls as well as to display information to a user. The base touch screen display 112 may provide data input by the user to the base CPU 132 e.g., in order to call a number or may output (display) an instruction or data received from the base CPU 132 e.g., there is an incoming call.

The base wireless transceiver 140 facilitates wireless communication with the wireless handset 120 according to a short-range wireless communication protocol. The base wireless transceiver 140 may provide voice data received during a telephone call to the wireless handset 120 as well as receive voice data from the wireless handset 120 during a telephone call. Moreover, the base wireless transceiver exchanges with the wireless handset 120 control signals determined by control logic, such as to switch calls between off-hook status and on-hook status.

The power supply 142 is connected to an external power source, such as an electrical outlet (not shown), and supplies electrical power to the components of the telephone base 110, including electrical power to the various components of the base system 130 as well as electrical power to the power transmitter 150. The power supply 142 supplies power to a charging coil 152 of the power transmitter 150.

The power transmitter 150 charges the wireless handset 120 using the charging coil 152. Moreover, the power transmitter 150 detects the presence and absence of the wireless handset 120 in the charging position 114 of the telephone base based on signaling performed as part of a wireless charging protocol performed, and notifies the base CPU 132. To act as the hook switch for hook switching status report.

Figure 2:
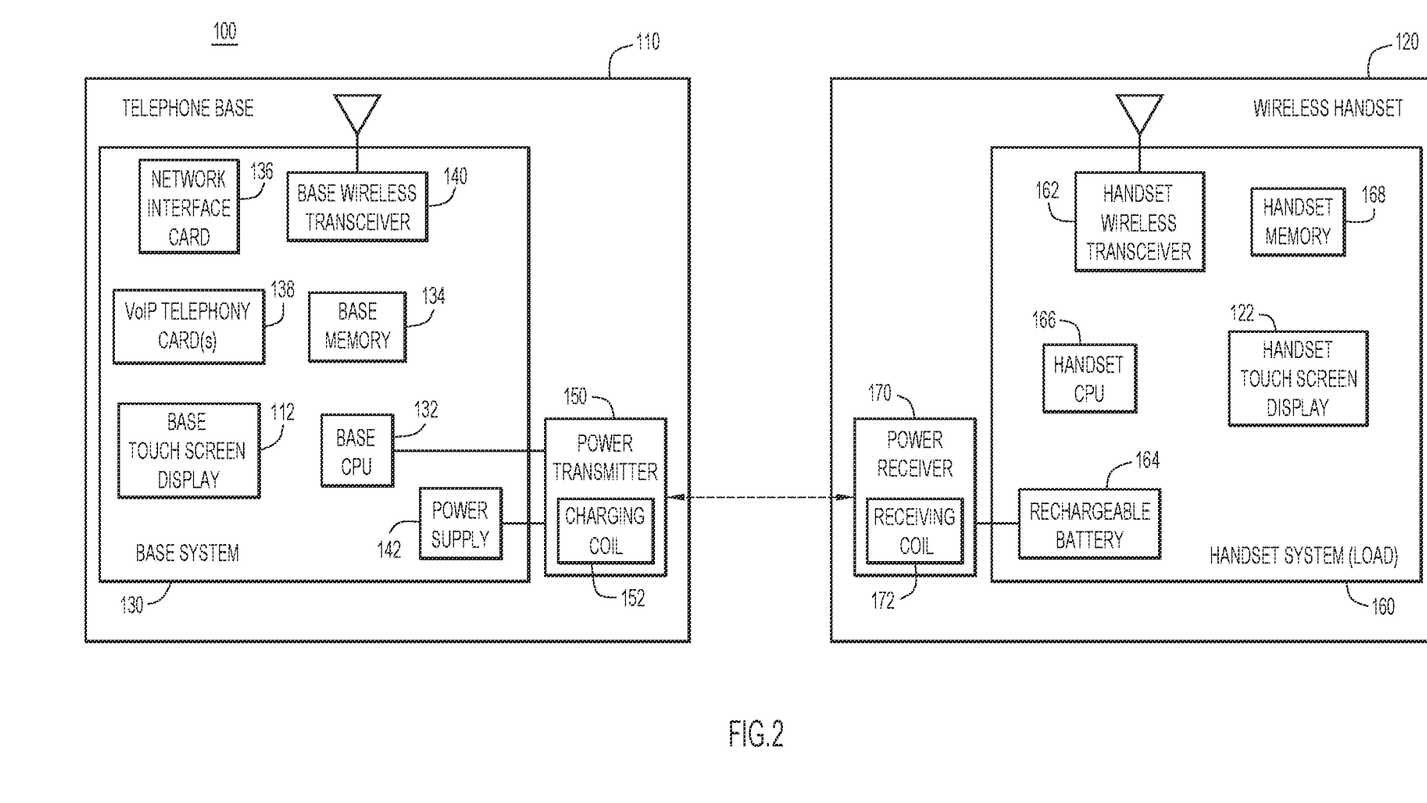
FIG. 2 is a block diagram illustrating various components of telephone base and wireless handset that enable wireless charging and hook switching apparatus, according to an example embodiment.

As shown in FIG. 2, the wireless handset 120 includes a handset system 160 and a power receiver 170. The handset system 160 includes a handset wireless transceiver 162, a rechargeable battery 164, a handset CPU 166, a handset memory 168, and the handset touch screen display 122. The power receiver 170 includes a receiving coil 172. The handset system 160 acts as a load with respect to the power receiver 170.

The receiving coil 172 receives power from the charging coil 152 of the power transmitter 150 of the telephone base 110 when the wireless handset 120 is in sufficient proximity to the charging position on the telephone base 110. When this occurs, the power transmitter 150 of the telephone base 110 charges the rechargeable battery 164 of the wireless handset 120.

The handset wireless transceiver 162, the handset CPU 166, the handset memory 168, and the handset touch screen display 122 are analogous to the components described above of the telephone base 110. Thus, detailed descriptions of these wireless handset components are omitted for the sake of brevity.

FIG. 2 is not meant to be exhaustive of the components of the desktop telephone 100. Additional components such as a speaker, a microphone, a camera, are also present as is known in the art. Moreover, the telephone base 110 and/or the wireless handset 120 may have voice-control capabilities.

Figure 3:
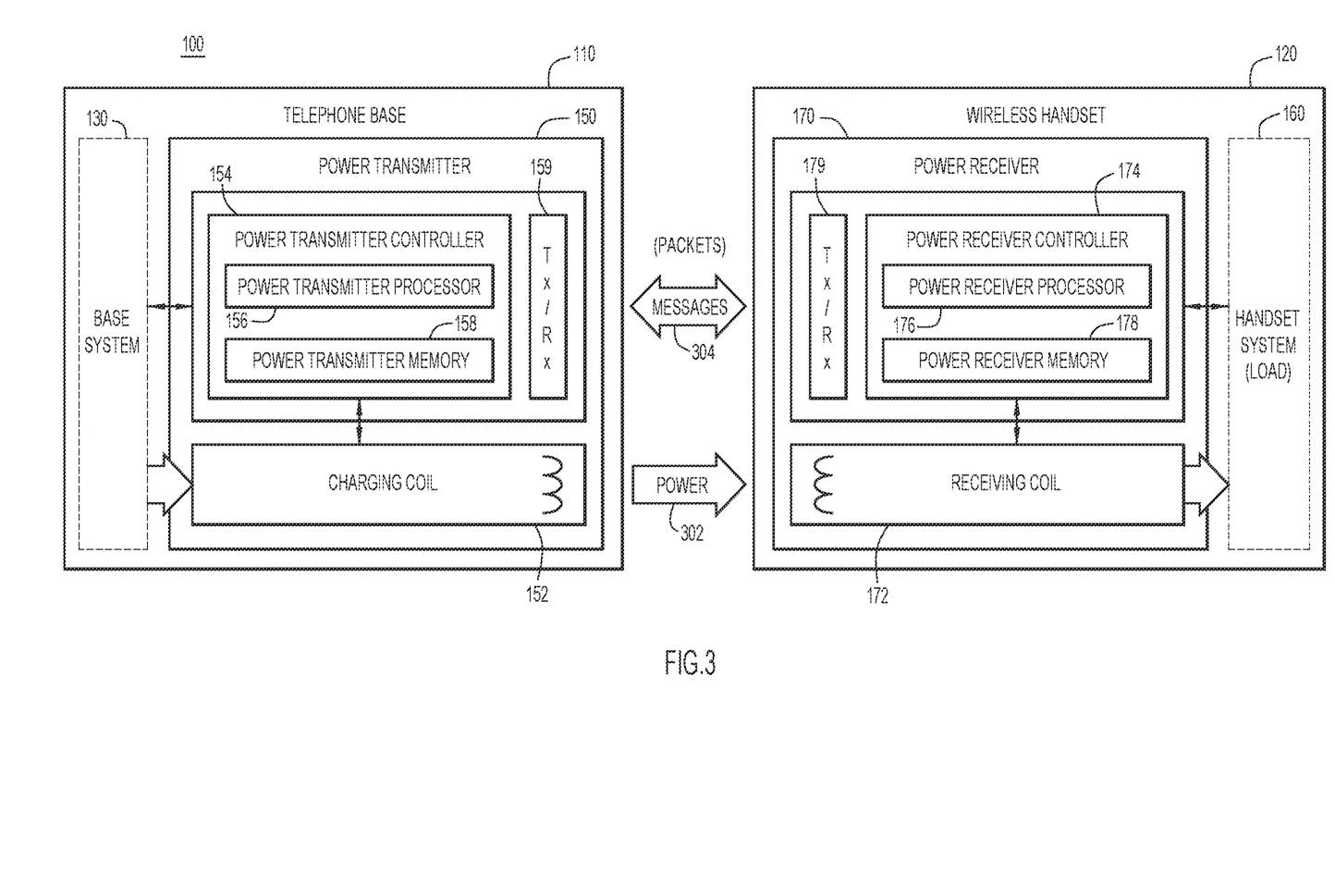
FIG. 3 is a more detailed block diagram illustrating interaction between a power transmitter of the telephone base and a power receiver of the wireless handset to enable wireless charging and hook switching, according to an example embodiment.

Various components of the power transmitter 150 and the power receiver 170 of the desktop telephone 100 are now described with reference to FIG. 3.

The power transmitter 150 includes the charging coil 152, a power transmitter controller 154, and a power transmitter wireless transceiver (Tx/Rx) 159. The power receiver 170 includes the receiving coil 172, the power receiver controller 174, and a power receiver wireless transceiver (Tx/Rx) 179. The power transmitter controller 154 includes a power transmitter processor 156 and a power transmitter memory 158. The power receiver controller 174 includes a power receiver processor 176 and a power receiver memory 178. The power transmitter processor 156 may be a CPU or digital signal processor that executes instructions based on one or more programs stored in the power transmitter memory 158. Likewise, the power receiver processor 176 may be a CPU or digital signal processor that executes instructions based on one or more programs stored in the power receiver memory 178. Alternatively, the power transmitter controller 154 and power receiver controller 174 may take the form of digital logic gates in a programmable gate array, and/or fixed digital logic in a fixed gate array. Further still, the power transmitter controller 154 and power receiver controller 174 may be embodied in one or more ASICs. Regardless of the particular form they may take, the power transmitter 150 and power receiver 170 may be configured to perform wireless charging operations as part of a wireless charging protocol, for example.

The power transmitter wireless transceiver 159 and the power receiver wireless transceiver 179 perform wireless communications to exchange messages according to a wireless charging protocol, as described in more detail below. The power transmitter wireless transceiver 159 and the power receiver wireless transceiver 179 each may include a radio frequency (RF) transceiver and modem that modulates messages sourced by the respective controller to be transmitted and demodulates received messages that are provided to the respective controller.

As shown at 302, power is transferred from the charging coil 152 of the power transmitter 150 to the receiving coil 172 of the power receiver 170.

At 304, the power transmitter 150 and the power receiver 170 exchange control signals (messages in a form of packets, for example) via an information communication interface established between the power transmitter 150 and the power receiver 170 using the power transmitter wireless transceiver 159 and the power receiver wireless transceiver 179.

In one embodiment, wireless power charging may be controlled according to a wireless power charging protocol. The WPC Qi protocol, for example, includes four phases: (1) a selection phase, (2) a ping phase, (3) an identification and configuration phase, and (4) a power transfer phase. Reference is also made to FIGS. 1A, 1B and 3 for purposes of this description.

Selection Phase.

During the selection phase, the power transmitter 150, under the control of the power transmitter controller 154, monitors the interface surface to detect presence and/or absence of an object(s) in the charging position 114. The object may be the wireless handset 120 or another device. The power transmitter 150 detects the presence of the object in the charging position 114 when the object is powered on. For example, a change in capacitance or resonance of the charging coil 152 is detected. When the power transmitter 150 detects the object, electromagnetic coupling between the power transmitter 150 and the power receiver 170 is performed. The electromagnetic coupling triggers the ping phase and the identification and configuration phase in which the object is validated. In an example embodiment, the selection phase is only performed when no device is detected on the interface surface of the power transmitter 150. The selection phase is used for monitoring and detecting the object, such as the wireless handset 120, placed on the interface surface. When the object is placed on the interface surface of the power transmitter 150, the selection phase ends and is not activated again while the object remains on the interface surface of the power transmitter 150.

Ping Phase.

During the ping phase, the power transmitter 150 transmits a digital ping (in a form of a control packet) to the power receiver 170, and waits for a response from the power receiver 170. If the power transmitter 150 discovers the power receiver 170 (receives the response at a signal strength above a predetermined threshold), the power transmitter 150 extends the ping phase by periodically transmitting the digital ping. Based on receiving the response (in a form of a packet), the power transmitter 150 also transitions to the identification and configuration phase.

Identification and Configuration Phase.

During the identification and configuration phase, the power transmitter 150 obtains identification information of the object (e.g., the wireless handset 120) and configuration information, such as the maximum amount of power that the power receiver 170 intends to provide at its output. The power transmitter 150 identifies the wireless handset 120 based on acquiring, from the power receiver 170, a handset identifier, transmitted by the power receiver 170. The handset identifier is a unique wireless power identifier (WPID) that is assigned to the wireless handset 120 prior to use, and is programmed into the telephone base 110 that corresponds to the wireless handset 120. The WPID may be stored in the power receiver 170 (e.g., the power receiver memory 178) and in the power transmitter 150 (e.g., the power transmitter memory 158).

If the WPID provided to the power transmitter 150 by the power receiver 170 matches the WPID stored in the power transmitter memory 158, the power transmitter 150 notifies the base CPU 132 (FIG. 2) to perform hook switching on behalf of the wireless handset 120.

Also, based on the configuration information, the power transmitter 150 enters the power transfer phase.

Power Transfer Phase.

In this phase, wireless charging is performed whereby the charging coil 152 provides power to the receiving coil 172 based on the configuration information obtained during the identification and configuration phase. During the power transfer phase, the information communication interface is supported (set up and remains available). The information communication interface provides feedback on charging and is utilized to detect when hook switching should be performed, as described in more detail below.

Figure 4:
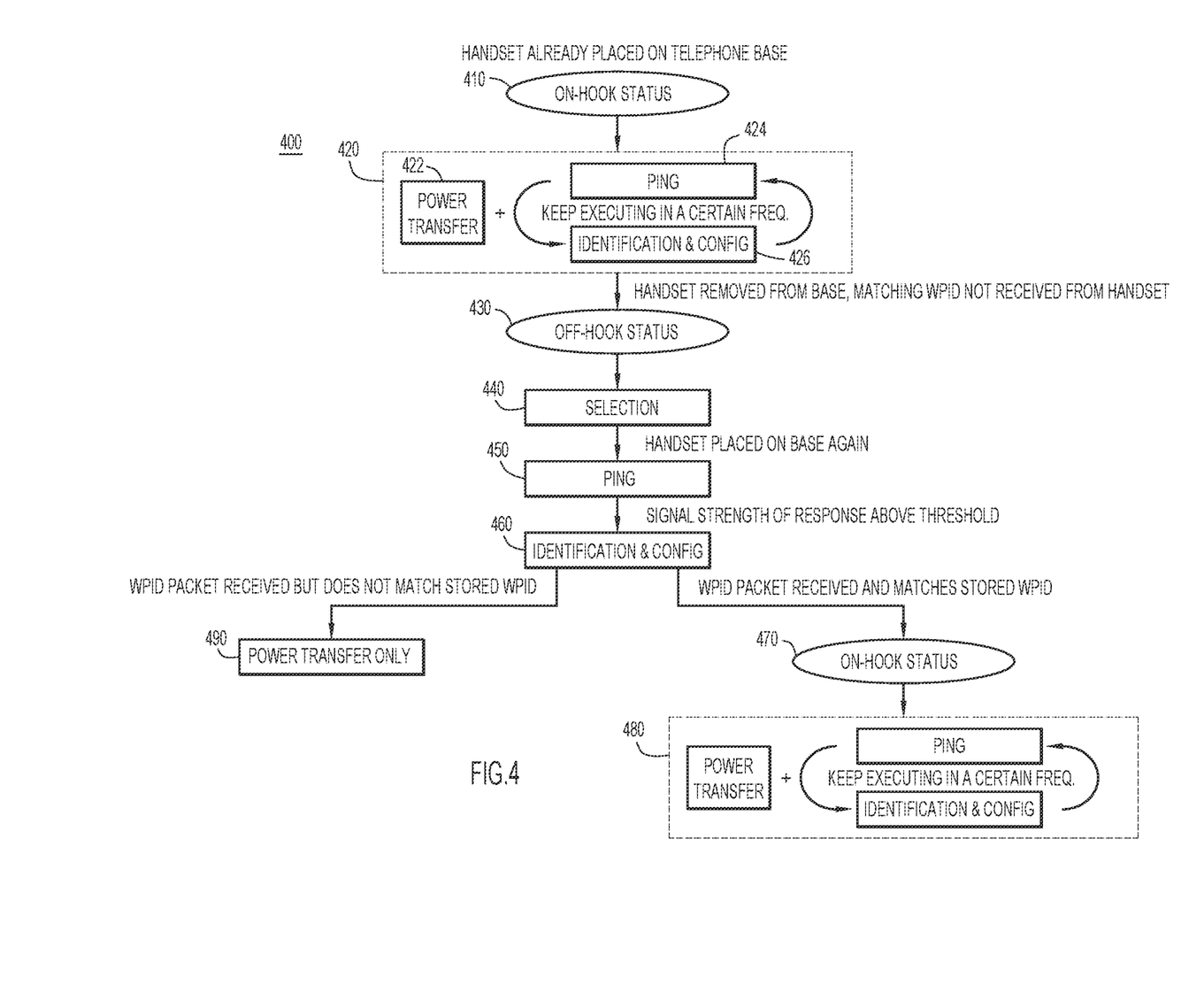
FIG. 4 is a flow diagram illustrating a method of performing hook switching of the desktop telephone apparatus through signaling performed according to a wireless charging protocol between the power transmitter and the power receiver depicted in FIG. 3, according to an example embodiment.

Reference is now made to FIG. 4. FIG. 4 is a flow chart illustrating a method 400 of performing hook switching based on the state changes occurring in the course of wireless charging between the telephone base 110 and the wireless handset 120, according to an example embodiment. Reference is also made to FIGS. 1A, 1B, 2, and 3 in connection with the description of FIG. 4.

At 410, the wireless handset 120 is (already) placed in the charging position 114 of the telephone base 110 and is therefore electromagnetically coupled to the telephone base 110. The power transmitter 150 has already matched the identifier received from the wireless handset with the stored identifier, and is in an on-hook status.

At 420, when the wireless handset 120 is in the on-hook status, the power transfer phase, ping phase, and identification & configuration phase are continuously performed. Specifically, at 422, the receiving coil 172 receives power from the charging coil 152, thereby charging the rechargeable battery 164 when charging is desired. If the wireless handset 120 is fully charged, the power transfer phase stops. However, the information communication interface remains open. That is, the power transmitter 150 and the power receiver 170 continue to exchange signals (messages) via the information communication interface, based on the ping phase and identification & configuration phase, at a predetermined frequency e.g., approximately 15 Hz according to the wireless charging protocol.

In particular, at 424, the power transmitter 150 executes a digital ping i.e., continuously sends a packet to request the WPID and configuration information. At 426, the power transmitter 150 continuously receives the WPID from the power receiver 170. Based on the configuration information, charging of the wireless handset 120 may resume. Since the power transmitter 150 continues to detect a matching WPID from the wireless handset 120, the power transmitter 150 continues to monitor activity in order to perform hook switching on behalf of the wireless handset 120.

When the wireless handset 120 is removed from the charging position 114, such as to answer an incoming call, the power transfer phase, the ping phase, and the identification and configuration phase end. When the power transmitter controller 154 fails to receive a matching WPID from the wireless handset 120, for a predetermined time interval, the power transmitter controller 154 notifies the base CPU 132 that the wireless handset 120 is no longer detected. The base CPU 132 places the telephone base 110 in the off-hook status, as shown at 430. When this occurs, the base CPU 132 communicates with the wireless handset 120 via the base wireless transceiver 140 to notify the wireless handset 120 that it should be in the off-hook status. In particular, the base CPU 132 receives an off-hook event notification. Based on the off-hook event notification, the base CPU 132 may take various actions. That is, the base CPU 132 is software controlled or pre-programmed to execute various actions depending on context and user interface (UI) definition or configuration.

By way of an example, based on the off-hook event notification and a detection that there are no incoming calls, the base CPU 132 notifies the wireless handset 120 to provide a dial tone to make a call. However, if no call is made within a predetermined period of time (e.g., 15 seconds), the base CPU 132 instructs the wireless handset 120 to assume an idle state. It is to be understood that the above is an example only and that the base CPU 132 may be programmed to perform various different actions based on notifications it receives from the power transmitter controller 154. Thus, the base CPU 132 may determine how to control the wireless handset 120 including whether to provide an automatic dial tone, pick up a call, etc. in response to notifications from the power transmitter controller 154 based on pre-programmed configurations and/or other states of the telephone base 110 (whether or not there is an incoming call, a configuration made on the wireless handset 120, etc.).

At 440, the power transmitter 150 returns to the selection phase in order to attempt to detect an object in the charging position 114.

At 450, when the object is detected, the ping phase (described above) is triggered.

At 460, when the signal strength of the response is above a predetermined threshold, the power transmitter 150 enters the identification and the configuration phase in which the WPID of the wireless handset is received. The power transmitter processor 156 compares the WPID received in the response packet with one or more WPIDs stored in the power transmitter memory 158.

At 470, based on detecting a match of the stored WPID and the WPID received from the wireless handset 120, the power transmitter 150 detects the on-hook status and may switch the wireless handset 120 to the on-hook status. In particular, the power transmitter processor 156 transmits to the base CPU 132 a notification indicating presence of the wireless handset 120 in the charging position 114 on the telephone base 110, so that the base CPU 132 will determine that this is an on hook status. In other words, the base CPU 132 determines that the wireless handset 120 should be in the on-hook status based on the notification coming from power transmitter 150. Based on this notification, the base CPU 132 is software controlled or pre-programmed to execute various actions depending on the context and UI definition and/or configuration. For example, if the telephone base 110 is in a "hands-free" mode, then the on-hook event notification from the power transmitter 150 does not result in disconnecting an ongoing call. On the other hand, if the telephone base 110 is in "handset" mode, the base CPU 132 may be programmed to automatically disconnect the ongoing call or disconnect the ongoing call after obtaining a confirmation from the user.

Further, since the WPIDs match, at 480, the power transmitter 150 transitions to the power transfer phase and establishes the information communication interface in which signals are continuously exchanged (the ping phase and the identification & configuration phase). The continuous loop of the ping and identification & configuration phases is executed to detect an off-hook status of the wireless handset 120.

On the other hand, if at 460, the WPID received from a device that supports wireless charging does not match the WPID stored in the power transmitter memory 158, only charging is performed at 490. That is, the two phases (ping phase and identification and & configuration phase) are not continuously performed because this mechanism is used for monitoring the on/off hook status of the wireless handset 120. Since the device is not the wireless handset 120, continuous execution of the ping phase and identification & configuration phase is not performed. In short, mismatch of the WPIDs indicates that the object placed in the charging position 114 is not the wireless handset 120 for which the telephone base 110 should perform hook switching. Thus, by comparing the WPIDs, false on-hook switching does not occur. The telephone base 110 only responds to changing states at the charging position if the WPID received from the power receiver 170 matches a WPID stored in the telephone base 110.

Since the power transmitter 150 and the power receiver 170 used for wireless charging are also used to implement the hook switching, no additional components are necessary and no additional power is consumed for the hook switching. By eliminating the mechanical hook switching, the desktop telephone 100 is more compact, and may be more aesthetically pleasing.

In various example embodiments, terms such as "transmit" and "receive" are broadly used herein to refer to techniques for providing and obtaining data and/or signals.

Figure 5:
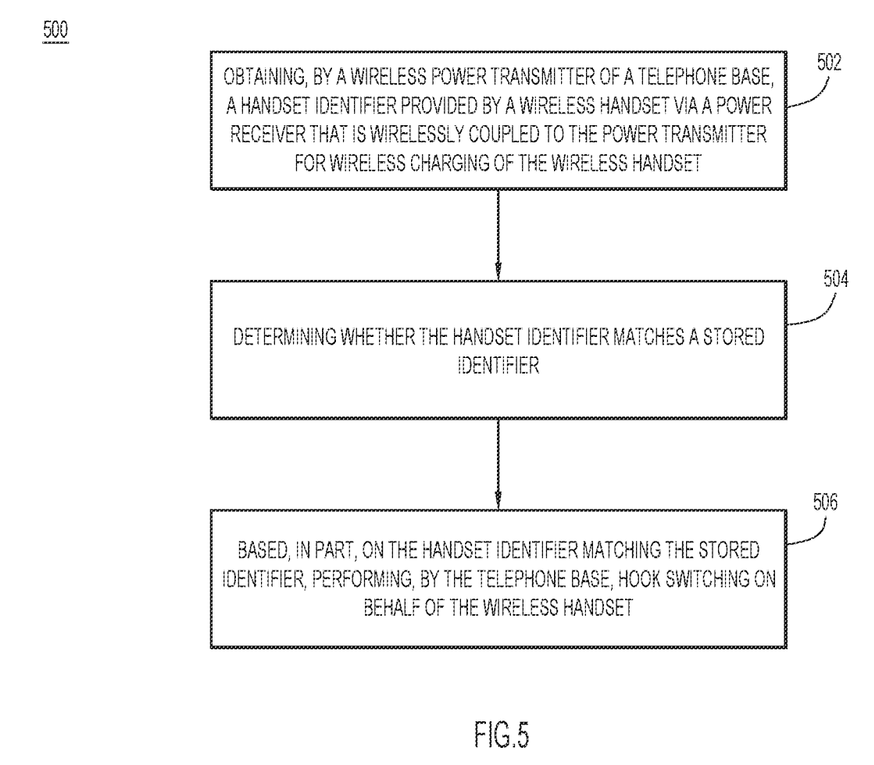
FIG. 5 is a flow diagram illustrating a method of performing hook switching by the telephone base on behalf of the wireless handset based on signaling during wireless charging operations, according to various example embodiments.

Turning now to FIG. 5, a flowchart is described of a method 500 for performing hook switching of the wireless handset based on wireless charging, according to various example embodiments. The method 500 is performed by an apparatus e.g., the telephone base 110 shown in FIGS. 1A, 1B, 2 and 3.

At 502, the method 500 involves obtaining, by a power transmitter of a telephone base, a handset identifier provided by a wireless handset via a power receiver that is wirelessly coupled to the power transmitter for wireless charging of the wireless handset.

At 504, the method 500 includes determining whether the handset identifier matches a stored identifier.

At 506, based on the handset identifier matching the stored identifier, the method 500 involves performing, by the telephone base, hook switching on behalf of the wireless handset.

In the method 500, the operation 506 of performing the hook switching on behalf of the wireless handset may include, based, in part, on obtaining the handset identifier that matches the stored identifier indicating presence of the wireless handset in a charging position on the telephone base, providing an on-hook status on behalf of the wireless handset.

In one form, the operation 506 of performing the hook switching on behalf of the wireless handset may further include, upon failure to obtain, for a predetermined time interval, the handset identifier that matches the stored identifier when the wireless handset is in the on-hook status, providing an off-hook status on behalf of the wireless handset.

In yet another form, the operation 506 of performing the hook switching on behalf of the wireless handset may further include, based on obtaining the handset identifier that matches the stored identifier, switching the off-hook status to the on-hook status on behalf of the wireless handset.

The method 500 may further include, upon the handset identifier obtained from the wireless handset via the power transmitter not matching the stored identifier, charging the wireless handset via the power transmitter without performing the hook switching events on behalf of the wireless handset.

According to one or more example embodiments, the operation 502 of obtaining the handset identifier may include establishing an information communication interface, according to a wireless charging protocol, between the power transmitter and the power receiver during the wireless charging of the wireless handset and exchanging signals via the information communication interface.

The wireless charging protocol may be a Wireless Power Consortium (WPC) Qi protocol.

The stored identifier may be a unique identifier according to a wireless charging protocol. The method 500 may further include, when the handset identifier matches the stored identifier, providing, by the power transmitter to a processor of the telephone base, an on-hook status notification indicating presence of the wireless handset in a charging position on the telephone base, indicative of an on-hook status. The method 500 may further include, upon failure to obtain, for a predetermined time interval, the handset identifier that matches the stored identifier when the wireless handset is in the on-hook status, providing, by the power transmitter to the processor of the telephone base, an off-hook notification representing absence of the wireless handset in the charging position on the telephone base, indicative of an off-hook status.

In still another example embodiment, an apparatus is provided. The apparatus is a telephone base 110. The apparatus includes a wireless transceiver configured to wirelessly communicate with a wireless handset, a memory configured to store one or more identifiers, a charging position on a surface of a housing, and a power transmitter positioned proximate the charging position. The power transmitter is configured to wirelessly provide power to a power receiver of the wireless handset in order to charge a rechargeable battery of the wireless handset when the wireless handset is in the charging position. The power transmitter is further configured to obtain, from the power receiver, a handset identifier that uniquely identifies the wireless handset, and determine whether the handset identifier matches one of the one or more identifiers stored in the memory. The apparatus further includes a processor coupled to the power transmitter and configured to perform hook switching on behalf of the wireless handset based on the power transmitter indicating that the handset identifier matches one of the one or more identifiers stored in the memory.

In one form, the processor may be configured to perform the hook switching on behalf of the wireless handset by, based on obtaining the handset identifier that matches one of the one or more identifiers stored in the memory, indicating presence of the wireless handset in the charging position, providing an on-hook status on behalf of the wireless handset.

In one or more example embodiments, the processor may further configured to perform the hook switching on behalf of the wireless handset by, upon failure to obtain, for a predetermined time interval, the handset identifier that matches one of the one or more identifiers stored in the memory when the wireless handset is in the on-hook status, providing an off-hook status on behalf of the wireless handset.

The processor may further be configured to perform the hook switching on behalf of the wireless handset by, based on obtaining the handset identifier that matches the one of the one or more identifiers stored in the memory, switching the off-hook status to the on-hook status on behalf of the wireless handset.

The processor may further be configured to perform, upon the handset identifier obtained from the wireless handset via the power transmitter not matching the one of the one or more identifiers stored in the memory, charging the wireless handset via the power transmitter without performing the hook switching on behalf of the wireless handset.

In one form, the power transmitter may further be configured to obtain the handset identifier by establishing an information communication interface, according to a wireless charging protocol, with the power receiver during charging of the rechargeable battery and exchanging signals with the power receiver via the information communication interface. The wireless charging protocol is a Wireless Power Consortium (WPC) Qi protocol.

In yet another example embodiment, a telephone such as the desktop telephone 100 is provided. The telephone includes a wireless handset and a telephone base. The wireless handset that includes a handset wireless transceiver, a rechargeable battery, and a power receiver configured to charge the rechargeable battery. The telephone base includes a base wireless transceiver configured to wirelessly communicate with the handset wireless transceiver, a memory configured to store one or more identifiers, a charging position on a surface of a housing, and a power transmitter positioned proximate the charging position. The power transmitter is configured to wirelessly provide power to the power receiver in order to charge the rechargeable battery when the wireless handset is in the charging position, obtain, from the power receiver, a handset identifier that uniquely identifies the wireless handset, and determine whether the handset identifier matches one of the one or more identifiers stored in the memory. The telephone base further includes a processor coupled to the power transmitter and configured to perform hook switching on behalf of the wireless handset based, in part, on the power transmitter indicating that the handset identifier matches the one of the one or more identifiers stored in the memory.

In one form, the processor may be configured to perform the hook switching on behalf of the wireless handset by, based on the power transmitter obtaining the handset identifier that matches the one of the one or more identifiers stored in the memory, indicating presence of the wireless handset in the charging position, providing an on-hook status on behalf of the wireless handset.

The processor may further be configured to perform the hook switching on behalf of the wireless handset by, upon failure, by the power transmitter, to obtain, for a predetermined time interval, the handset identifier that matches the one of the one or more identifiers stored in the memory when the wireless handset is in the on-hook status, providing an off-hook status on behalf of the wireless handset.

According to one or more example embodiments, the processor may further be configured to perform the hook switching on behalf of the wireless handset by, based on the power transmitter obtaining the handset identifier that matches the one of the one or more identifiers stored in the memory, switching the off-hook status to the on-hook status on behalf of the wireless handset.

In one form, the power transmitter may further be configured to perform, upon the handset identifier obtained from the wireless handset via the power transmitter not matching the one of the one or more identifiers stored in the memory, charging the wireless handset via the power transmitter without performing the hook switching on behalf of the wireless handset.

The power transmitter may further be configured to obtain the handset identifier by establishing an information communication interface, according to a wireless charging protocol, with the power receiver during charging of the rechargeable battery and exchanging signals with the power receiver via the information communication interface. The wireless charging protocol may be a Wireless Power Consortium (WPC) Qi protocol.

The embodiments presented may be in other various other forms, such as a system or a computer program product. The computer program product may include a computer readable storage medium (or media) having computer readable program instructions thereon for causing a telephone or a telephone base to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., keyboard, keypad, etc.). The interface screens may include any suitable actuators (e.g., links, tabs, etc.) to navigate between the screens in any fashion.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., local area network (LAN), wide area network (WAN), Internet, Intranet, virtual private network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   detecting, by a power transmitter of a telephone base, a wireless handset that is wirelessly coupled to the power transmitter of the telephone base for wireless charging of the wireless handset using a power receiver of the wireless handset; and
   based, in part, on the wireless handset being detected by the power transmitter of the telephone base by signaling performed as part of a wireless charging protocol, performing, by the telephone base, hook switching on behalf of the wireless handset.

2. The method of claim 1, wherein performing the hook switching on behalf of the wireless handset includes:
   based on a presence of the wireless handset in a charging position on the telephone base, providing an on-hook status on behalf of the wireless handset.

3. The method of claim 1, further comprising:
   identifying, by the telephone base, the wireless handset using the wireless charging protocol.

4. The method of claim 3, wherein the wireless charging protocol is a Wireless Power Consortium (WPC) Qi protocol and performing the hook switching includes providing an on-hook status on behalf of the wireless handset based on identifying the wireless handset as matching with the telephone base.

5. The method of claim 1, further comprising:
   determining whether the wireless handset matches the telephone base.

6. The method of claim 1, further comprising:
   establishing an information communication interface, according to the wireless charging protocol, between the power transmitter and the power receiver during the wireless charging of the wireless handset; and
   exchanging signals, via the information communication interface, to identify the wireless handset.

7. The method of claim 6, wherein the wireless charging protocol is a Wireless Power Consortium (WPC) Qi protocol.

8. The method of claim 1, wherein performing the hook switching on behalf of the wireless handset further includes:
   upon failure to detect, for a predetermined time interval, the wireless handset when the wireless handset is in an on-hook status, providing an off-hook status on behalf of the wireless handset.

9. An apparatus comprising:
   a wireless transceiver configured to wirelessly communicate with a wireless handset;
   a charging position on a surface of a housing;
   a power transmitter positioned proximate to the charging position, and configured to:
      wirelessly provide power to a power receiver of the wireless handset in order to charge a rechargeable battery of the wireless handset when the wireless handset is in the charging position, and
      detect the wireless handset placed in the charging position; and
   a processor coupled to the power transmitter and configured to perform hook switching on behalf of the wireless handset based, in part, on the power transmitter detecting the wireless handset in the charging position by signaling performed as part of a wireless charging protocol.

10. The apparatus of claim 9, further comprising:
    a memory configured to store one or more identifiers,
    wherein the processor is configured to perform the hook switching on behalf of the wireless handset further based on the power transmitter obtaining a handset identifier that matches one of the one or more identifiers stored in the memory.

11. The apparatus of claim 10, wherein the processor is configured to perform the hook switching on behalf of the wireless handset by:
    upon failure by the power transmitter to obtain, for a predetermined time interval, the handset identifier that matches one of the one or more identifiers stored in the memory when the wireless handset is in an on-hook status, providing an off-hook status on behalf of the wireless handset.

12. The apparatus of claim 9, wherein the processor is further configured to:
    identify the wireless handset using the wireless charging protocol.

13. The apparatus of claim 12, wherein the wireless charging protocol is a Wireless Power Consortium (WPC) Qi protocol and the processor is configured to perform the hook switching by providing an on-hook status on behalf of the wireless handset based on identifying the wireless handset as matching with the apparatus.

14. The apparatus of claim 9, wherein the power transmitter is further configured to:
    establish an information communication interface, according to the wireless charging protocol, between the power transmitter and the power receiver during wireless charging of the wireless handset; and
    exchange signals, via the information communication interface, to identify the wireless handset.

15. The apparatus of claim 14, wherein the wireless charging protocol is a Wireless Power Consortium (WPC) Qi protocol.

16. A telephone comprising:
    a wireless handset that includes:
       a handset wireless transceiver,
       a rechargeable battery, and
       a power receiver configured to charge the rechargeable battery; and
    a telephone base that includes:
       a base wireless transceiver configured to wirelessly communicate with the handset wireless transceiver,
       a charging position on a surface of a housing,
       a power transmitter positioned proximate to the charging position, and configured to:
          wirelessly provide power to the power receiver in order to charge the rechargeable battery when the wireless handset is in the charging position, and
          detect the wireless handset in the charging position, and
       a processor coupled to the power transmitter and configured to perform hook switching on behalf of the wireless handset based, in part, on the power transmitter detecting the wireless handset in the charging position by signaling performed as part of a wireless charging protocol.

17. The telephone of claim 16, wherein the processor is configured to perform the hook switching further by providing an on-hook status on behalf of the wireless handset based on the power transmitter detecting a presence of the wireless handset in the charging position.

18. The telephone of claim 16, wherein the power transmitter is further configured to identify the wireless handset using the wireless charging protocol.

19. The telephone of claim 18, wherein the wireless charging protocol is a Wireless Power Consortium (WPC) Qi protocol and the processor is configured to perform the hook switching by providing an on-hook status on behalf of the wireless handset based on the power transmitter identifying the wireless handset as matching with the telephone base.

20. The telephone of claim 16, wherein the power transmitter is further configured to:
- establish an information communication interface, according to the wireless charging protocol, between the power transmitter and the power receiver during wireless charging of the wireless handset; and
- exchange signals, via the information communication interface, to identify the wireless handset.

\* \* \* \* \*